(12) United States Patent  
Jain

(10) Patent No.: US 9,176,821 B2  
(45) Date of Patent: Nov. 3, 2015

(54) WATCHPOINT SUPPORT SYSTEM FOR FUNCTIONAL SIMULATOR

(71) Applicant: Sandeep Jain, Ghaziabad (IN)

(72) Inventor: Sandeep Jain, Ghaziabad (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 269 days.

(21) Appl. No.: 14/067,920

(22) Filed: Oct. 30, 2013

(65) Prior Publication Data

US 2015/0121127 A1  Apr. 30, 2015

(51) Int. Cl.
*G06F 11/36* (2006.01)
*G06F 11/14* (2006.01)
*G06F 12/08* (2006.01)

(52) U.S. Cl.
CPC ........ *G06F 11/1402* (2013.01); *G06F 12/0802* (2013.01); *G06F 12/0875* (2013.01)

(58) Field of Classification Search
CPC ............ G06F 11/3644; G06F 11/0802; G06F 11/0875
USPC ................................. 714/34, 35, 32
See application file for complete search history.

(56) References Cited

U.S. PATENT DOCUMENTS

| | | | | |
|---|---|---|---|---|
| 6,820,195 B1* | 11/2004 | Shepherd | ............ | G06F 9/30032 711/201 |
| 7,047,520 B2 | 5/2006 | Moore et al. | | |
| 7,765,526 B2 | 7/2010 | Chen et al. | | |
| 2003/0084375 A1* | 5/2003 | Moore | .................. | G06F 11/362 714/34 |
| 2006/0195825 A1* | 8/2006 | Vanspauwen | ....... | G06F 17/5009 717/135 |
| 2008/0127035 A1* | 5/2008 | Lev | ........................ | G06F 11/362 717/100 |
| 2013/0173887 A1* | 7/2013 | Kenney | ............... | G06F 9/30003 712/218 |

* cited by examiner

*Primary Examiner* — Chae Ko
(74) *Attorney, Agent, or Firm* — Charles Bergere

(57) ABSTRACT

A functional simulator with watchpoint support includes a CPU having a first-level DMI cache, a watchpoint manager having a second-level DMI cache, an interconnect module, and a memory controller. The simulator is operated by a front-end tool. Watchpoints corresponding to a predetermined memory addresses are set by the front-end tool and stored as a watchpoint address list in the watchpoint manager. When a memory access request is received by the first-level DMI cache, after a failure to complete the memory access request, the CPU transmits the request to the watchpoint manager. The watchpoint manager searches for a memory address associated with the memory access request in the watchpoint address list. If a match is found, the watchpoint manager generates a watchpoint hit signal and notifies the front-end tool.

9 Claims, 3 Drawing Sheets

WATCHPOINT SUPPORT SYSTEM FOR FUNCTIONAL SIMULATOR

BACKGROUND OF THE INVENTION

The present invention relates generally to computer software debugging tools, and more particularly, to a system for implementing watchpoint support in a functional simulator.

Debugging tools are commonly used to identify faults or bugs in a computer program that may cause the program to function erroneously. A debugging tool is used to set breakpoints in the computer program for debugging. When the program encounters a breakpoint, the program execution pauses so that various program parameters, viz., register values, memory values, the call stack, and the like, can be verified in order to determine the source of bugs.

A watchpoint is a type of breakpoint that is triggered when a predefined memory address is referenced by the computer program. Triggering the watchpoint generates a watchpoint interrupt, which causes the program execution to be suspended and then continued using a special code called a watchpoint interrupt handler.

Several techniques exist for implementing watchpoints in a debugging tool. One technique is by altering access attributes of memory pages in which watched memory addresses are located, such as to read-only access. When the program accesses that particular memory page to access the memory address, a fault signal indicating a page access violation is generated and a page fault handler is invoked in the debugging tool. The page fault handler determines whether an actual watchpoint has been hit and if so, then a front-end is notified about the watchpoint hit, otherwise access attributes are changed to write-allowed and single-stepping is performed. Upon completion of the single-stepping, the debugging tool resets the access attributes of the memory page to read-only to identify additional subsequent accesses to the memory address.

Though conventional functional simulators successfully enable watchpoint hit detection and debugging using conventional watchpoint mechanisms, they are fraught with several shortcomings. The conventional watchpoint implementation mechanisms are based on memory page access attributes management. As a result, once a watchpoint is encountered, hundreds to thousands of processor cycles are required for invoking the page fault handler and resuming simulation from the faulting instruction, which leads to poor debugging performance. Further, different operating systems have different semantics for altering memory protection attributes. Thus, the debugging tool must be reprogrammed each time it's run on a different operating system platform, which causes portability issues. Further, conventional functional simulators are difficult to integrate with third party tools. The third party tools need to be provided access to internal data structures that model memory to allow change in the access permissions.

Therefore, it would be advantageous to have a functional simulator that has efficient watchpoint support with negligible overhead on simulation performance, is easy to migrate across different host platforms and operating systems, can be seamlessly integrated with third-party tools, and overcomes the above-mentioned limitations of conventional functional simulators.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
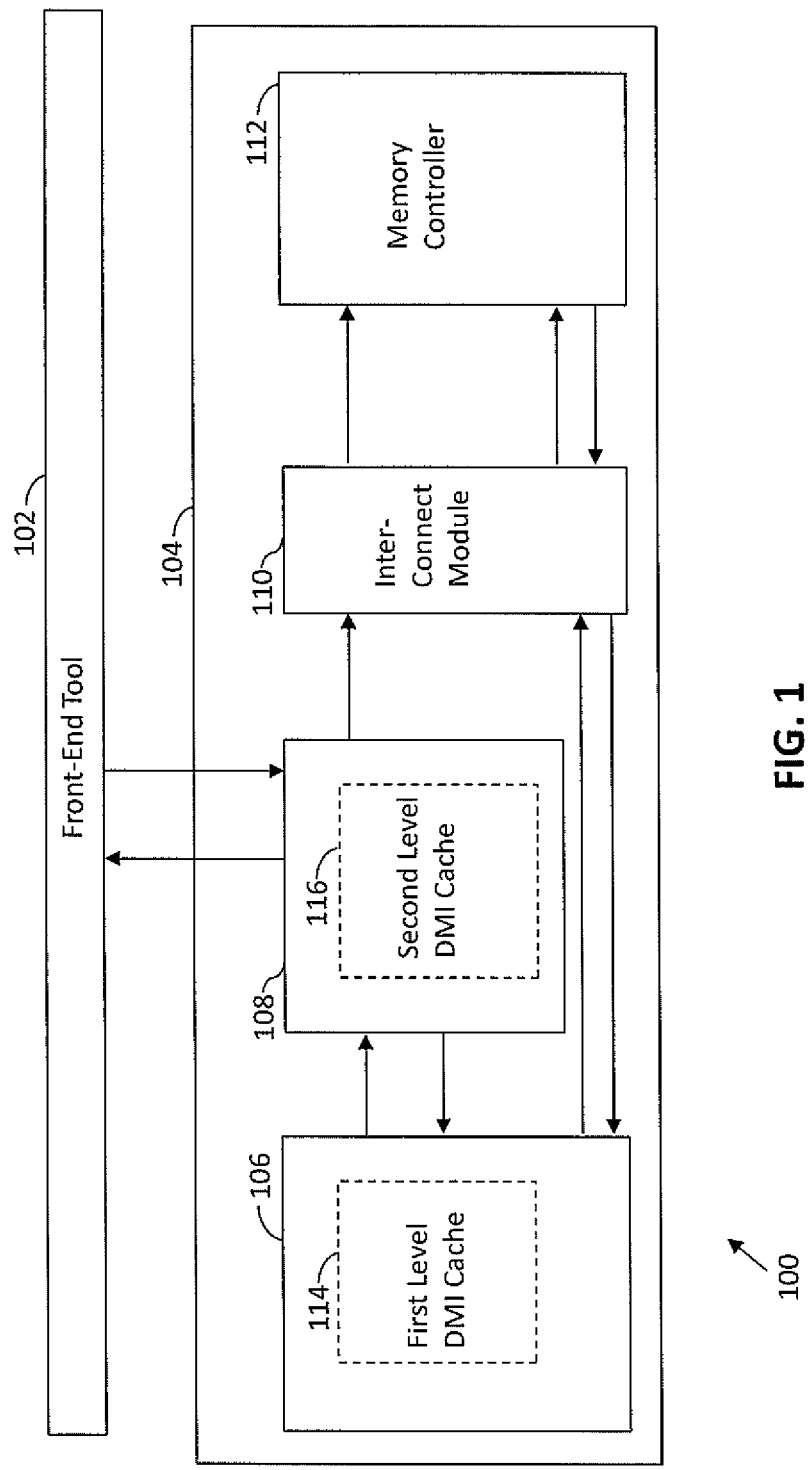
FIG. 1 is a schematic block diagram of a debugging tool in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a functional simulator with watchpoint support is provided. The functional simulator is operated by a front-end tool. The functional simulator includes a CPU that in turn includes a first-level DMI cache for storing a first plurality of memory pages and associated memory addresses, and receiving a memory access request for a first memory address. The functional simulator further includes a watchpoint manager, connected to the CPU, for storing a second plurality of memory pages and associated memory addresses as a watchpoint address list corresponding to which a plurality of watchpoints are assigned by the front-end tool.

The watchpoint manager receives the memory access request subsequent to the first-level DMI cache failing to complete the memory access request, searches the first memory address associated with the memory access request in the watchpoint address list, generates a watchpoint hit signal when the first memory address is present in the watchpoint address list, and notifies the front-end tool when the watchpoint hit signal is generated.

In another embodiment of the present invention, a method for operating a functional simulator with watchpoint support is provided. The functional simulator is run by a front-end tool and includes a central processing unit (CPU) having a first-level DMI cache, a watchpoint manager having a second-level DMI cache, and a memory controller module. The method includes assigning a plurality of watchpoints to a plurality of memory addresses by the front-end tool. The plurality of watchpoints is added to a watchpoint address list by the watchpoint manager. The watchpoint address list is stored in the watchpoint manager.

A DMI access to the first-level DMI cache corresponding to a plurality of memory pages associated with the plurality of memory addresses is invalidated by the CPU. A plurality of access bits is set to negative by the CPU to prevent the DMI access to the plurality of memory pages during an execution of a subsequent memory access request. The memory access request is received by the first-level DMI cache for a first memory address. The memory access request is transmitted to the watchpoint manager by the CPU subsequent to failing to complete the memory access request by the first-level DMI cache. The first memory address associated with the memory access request is searched in the watchpoint address list by the watchpoint manager. A watchpoint hit signal is generated by the watchpoint manager when the first memory address is present in the watchpoint address list. The first memory address is searched in the second-level DMI cache when the first memory address is not present in the watchpoint address list. Subsequently, the memory access request is transmitted to the memory controller for completion when the first memory address is absent in the second-level DMI cache.

Various embodiments of the present invention provide a functional simulator that has a watchpoint support and can be operated by a front-end tool. The functional simulator includes a CPU, a watchpoint manager, an interconnect module, and a memory controller. The CPU and the watchpoint manager include first-level and second-level DMI caches. A plurality of watchpoints is set corresponding to a plurality of memory addresses by way of the front-end tool and stored as a watchpoint address list in the watchpoint manager. A DMI access to the plurality of memory pages associated with the plurality of memory addresses corresponding to which watchpoints have been set is blocked. The DMI access is blocked by the CPU by setting access bits associated with the plurality of memory pages to negative. When a memory access request is received by the first-level DMI cache corresponding to one of the plurality of memory addresses, the DMI access is not available to the memory address and a watchpoint hit signal is generated by the watchpoint manager and the front-end tool is notified. Thus, the functional simulator implements the watchpoint feature by preventing DMI access to the plurality of memory addresses corresponding to which the watchpoints have been set.

Since, the DMI access is used to implement the watchpoint feature, the access permissions of the memory pages are not and need not be altered. This eliminates the process of invoking a page-fault handler when a memory page having a read-protect access permission is accessed by a software program. Eliminating the need to invoke the page-fault handler saves considerable number of CPU cycles and hence improves debugging tool performance. Since the functional simulator does not require altering memory protection attributes, the need for reprogramming the debugging tool each time its run on a different operating system platform is eliminated. Furthermore, the functional simulator does not require providing access to internal data structures that model memory to allow change in the access permissions, thus enabling easy integration with third-party tools.

Referring now to FIG. 1, a debugging tool 100 in accordance with an embodiment of the present invention is shown. The debugging tool 100 includes a front-end tool 102 and a functional simulator 104. The functional simulator 104 includes a central processing unit (CPU) 106, a watchpoint manager 108, an interconnect module 110, and a memory controller 112. The CPU 106 includes a first-level direct memory interface (DMI) cache 114 and the watchpoint manager 108 includes a second-level DMI cache 116.

The functional simulator 104 is integrated with the front-end tool 102 for debugging a software program. The front-end tool 102 acts as the interface between the simulator 104 and a user. The user can assign a first plurality of watchpoints to a first plurality of memory addresses of memory cells to be monitored during debugging, using the front-end tool 102. The watchpoint manager 108 stores the first plurality of memory addresses, which correspond to the first plurality of watchpoints assigned as a watchpoint address list (not shown) in the watchpoint manager 108.

The CPU 106 also stores a second plurality of memory pages and associated memory addresses in the first-level DMI cache 114. It will be understood by those of skill in the art that storing the second plurality of memory pages in the first-level DMI caches 114 aids the processing of memory access requests by enabling quicker memory read transactions. The second plurality of memory pages are selected by the CPU 106 from memory pages stored in a primary memory (not shown) based on a cache fetch algorithm.

Subsequent to storing the second plurality of memory pages, the CPU 106 invalidates a DMI access to the first-level DMI cache 114 corresponding to a first plurality of memory pages associated with the first plurality of memory addresses during an execution of a subsequent memory access request. The CPU 106 invalidates the DMI access by setting a plurality of access bits associated with the first plurality of memory pages to negative.

Additionally, a third plurality of memory pages of the first plurality of memory pages that are present in the first-level DMI cache (and hence invalidated) are stored in the second-level DMI cache 116. When the CPU 106 receives a memory access request, the CPU 106 searches for a memory address associated with the memory access request in the first-level DMI cache 114. If the DMI access is not available for the memory access request, i.e., either the memory address is one of the first plurality of memory addresses or the memory address is not actually present in the first-level DMI cache 114, the memory access request is transmitted to the watchpoint manager 108.

The watchpoint manager 108 searches the memory address associated with the memory access request in the watchpoint address list and generates a watchpoint hit signal when the memory address is present in the watchpoint address list. Thereafter, the watchpoint manager 108 searches the memory address in the second-level DMI cache 116 when the memory address is not present in the watchpoint address list, and notifies the front-end tool 102 when the watchpoint hit signal is generated. If the memory address is not present in the second-level DMI cache 116, the watchpoint manager 108 transmits the memory access request to the memory controller 112 for completion by way of the interconnect module 110. In an embodiment of the present invention, the interconnect module 110 simulates a bus system. The memory controller 112 receives the memory access request from the watchpoint manager 108, and completes the memory access request.

Since, the DMI access is used to implement the watchpoint feature, the access permissions of the plurality of memory pages need not be altered. This eliminates the process of invoking a page-fault handler when a memory page having a read-protect access permission is accessed by a software program. Eliminating the need to invoke the page-fault handler saves a considerable number of CPU cycles, which improves debugging tool performance.

Figure 2A:
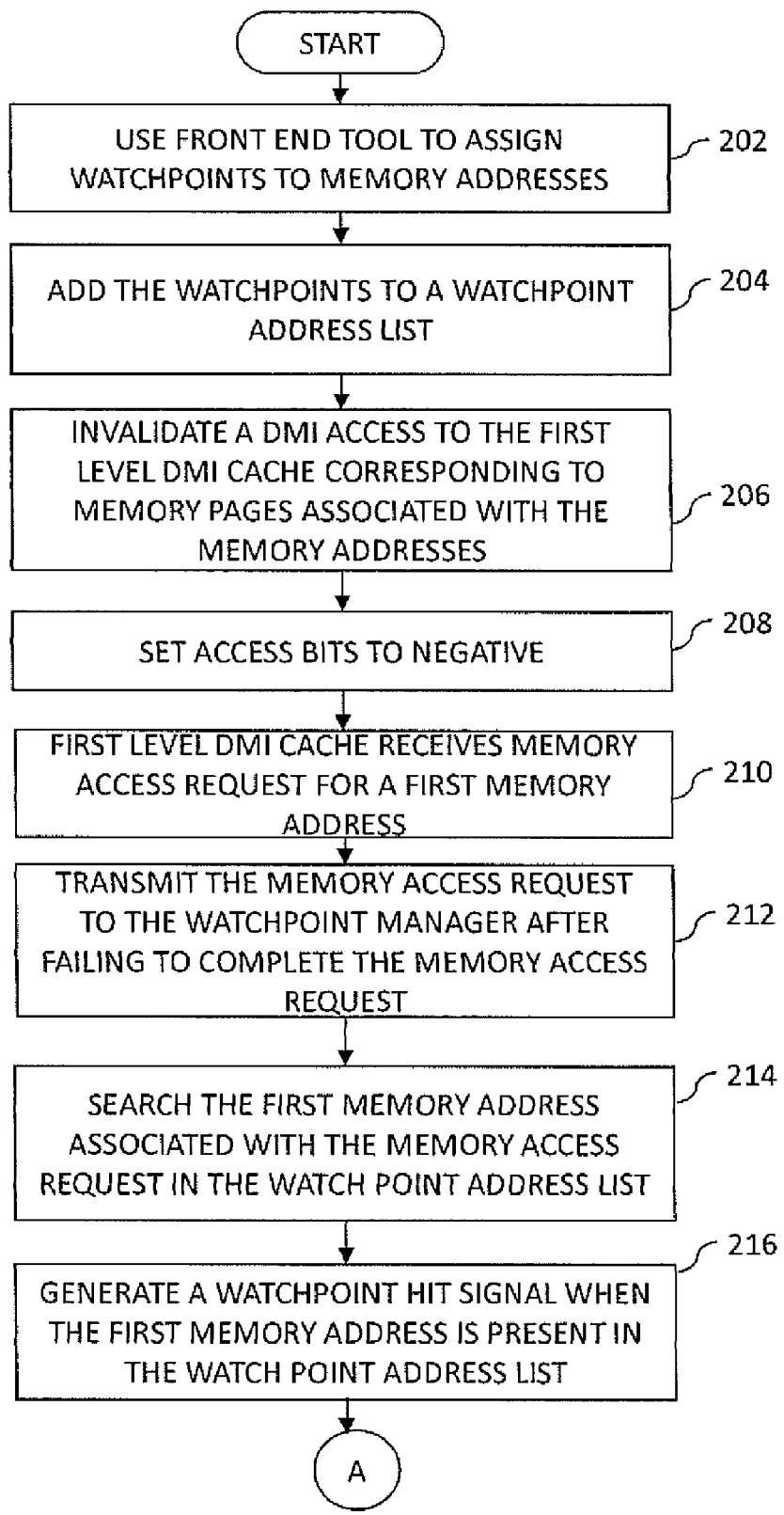
FIGS. 2A and 2B are a flow chart of a method for operating the debugging tool of FIG. 1 in accordance with an embodiment of the present invention.
Figure 2B:
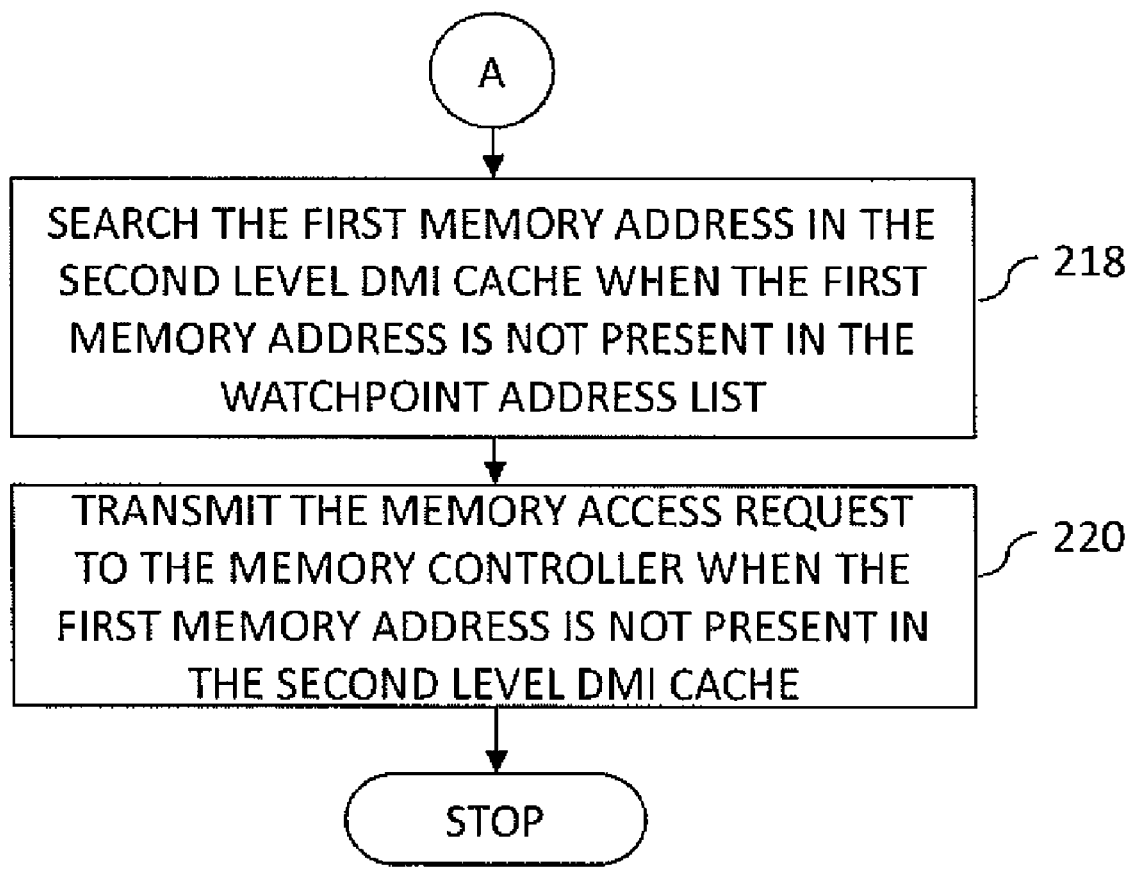

Referring now to FIGS. 2A and 2B, a flow chart of a method for operating the debugging tool 100 in accordance with an embodiment of the present invention is shown.

At step 202, a first plurality of watchpoints is assigned to a first plurality of memory addresses by the front-end tool 102. At step 204, the first plurality of watchpoints is added to a watchpoint address list by the watchpoint manager 108 and stored therein. At step 206, a DMI access to the first-level DMI cache 114 corresponding to the first plurality of memory pages associated with the first plurality of memory addresses is invalidated by the CPU 106 as explained in conjunction with FIG. 1. Additionally, memory pages of the first plurality of memory pages that are present in the first-level DMI cache (and hence invalidated) are stored in the second-level DMI cache 116.

At step 208, a plurality of access bits associated with the first plurality of memory addresses is set to negative by the CPU 106 to prevent the DMI access to the first plurality of memory pages during an execution of a subsequent memory access request. At step 210, the first-level DMI cache 114 receives a memory access request. The CPU 106 searches for a memory address associated with the memory access request in the first-level DMI cache 114. If the DMI access is not available for the memory access request, i.e., either the memory address is one of the first plurality of memory addresses or the memory address is not actually present in the first-level DMI cache 114, the memory access request is transmitted to the watchpoint manager 108 as explained in conjunction with FIG. 1.

At step 212, the memory access request is transmitted to the watchpoint manager 108 by the CPU 106 subsequent to failing to complete the memory access request by the first-level DMI cache 114. At step 214, the watchpoint manager 108 searches the first memory address associated with the memory access request in the watchpoint address list as explained in conjunction with FIG. 1. At step 216, the watchpoint manager 108 generates a watchpoint hit signal when the first memory address is present in the watchpoint address list and notifies the front-end tool 102 that a watchpoint has been hit as explained in conjunction with FIG. 1. At step 218, the watchpoint manager 108 searches the memory address in the second-level DMI cache 116 when the memory address is not present in the watchpoint address list. At step 220, the memory access request is transmitted to the memory controller 112 by the watchpoint manager 108 for completion when the memory address is absent in the second-level DMI cache 116. The memory access request is transmitted by way of the interconnect module 110. In an embodiment of the present invention, the interconnect module 110 simulates a bus system.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A functional simulator with watchpoint support and operated by a front-end tool, the functional simulator comprising:
a central processing unit (CPU) including a first-level direct memory interface (DMI) cache for storing a first plurality of memory pages and associated memory addresses, wherein the CPU receives a memory access request for a first memory address;
a watchpoint manager, connected to the CPU, for storing a watchpoint address list comprising a second plurality of memory pages and associated memory addresses, wherein for the watchpoint address list, a corresponding plurality of watchpoints are assigned by the front-end tool,
wherein the watchpoint manager receives the memory access request if the first-level DMI cache fails to complete the memory access request, searches the first memory address associated with the memory access request in the watchpoint address list, generates a watchpoint hit signal when the first memory address is present in the watchpoint address list, and notifies the front-end tool when the watchpoint hit signal is generated.

2. The functional simulator of claim 1, wherein the CPU invalidates a DMI access to the first-level DMI cache corresponding to the second plurality of memory pages and associated memory addresses.

3. The functional simulator of claim 1, wherein the watchpoint manager further includes a second-level DMI cache for storing a third plurality of memory pages and associated memory addresses of the second plurality of memory pages, and associated memory addresses that are present in the first-level DMI cache.

4. The functional simulator of claim 3, wherein the watchpoint manager searches the first memory address in the second-level DMI cache when the first memory address is not present in the watchpoint address list.

5. The functional simulator of claim 4, further comprising a memory controller, connected to the watchpoint manager, for receiving the memory access request from the watchpoint manager, and completing the memory access request when the first memory address is not present in the second-level DMI cache.

6. The functional simulator of claim 5, further comprising an interconnect module, connected to the watchpoint manager and the memory controller, for simulating a bus system.

7. A method for operating a functional simulator with watchpoint support, wherein the functional simulator is run by a front-end tool, the functional simulator including a central processing unit (CPU) having a first-level direct memory interface (DMI) cache, a watchpoint manager having a second-level DMI cache, and a memory controller, the method comprising:
assigning a plurality of watchpoints to a first plurality of memory addresses by the front-end tool;
adding the plurality of watchpoints to a watchpoint address list by the watchpoint manager, wherein the watchpoint address list is stored in the second-level DMI cache;
invalidating a DMI access to the first-level DMI cache corresponding to a first plurality of memory pages associated with the first plurality of memory addresses, wherein the CPU invalidates the DMI access;
setting a plurality of access bits negative to prevent the DMI access to the first plurality of memory pages during execution of a subsequent memory access request, wherein the plurality of access bits is set by the CPU;
receiving a memory access request by the first-level DMI cache for a first memory address;
transmitting the memory access request to the watchpoint manager by the CPU if the first-level DMI caches fails to complete the memory access request;
searching for the first memory address associated with the memory access request in the watchpoint address list by the watchpoint manager;
generating a watchpoint hit signal when the first memory address is present in the watchpoint address list;
searching for the first memory address in the second-level DMI cache when the first memory address is not present in the watchpoint address list, wherein the second-level DMI cache stores a second plurality of memory pages and associated memory addresses of the first plurality of memory pages and associated memory addresses that are present in the first-level DMI cache; and
transmitting the memory access request to the memory controller for completing the memory access request when the first memory address is absent from the second-level DMI cache.

8. The method of claim 7, further comprising the watchpoint manager notifying the front-end tool when the watchpoint hit signal is generated.

9. The method of claim 7, wherein the memory access request is transmitted to the memory controller by way of an interconnect module, wherein the interconnect module simulates a bus system.

* * * * *